United States Patent Office 3,131,246
Patented Apr. 28, 1964

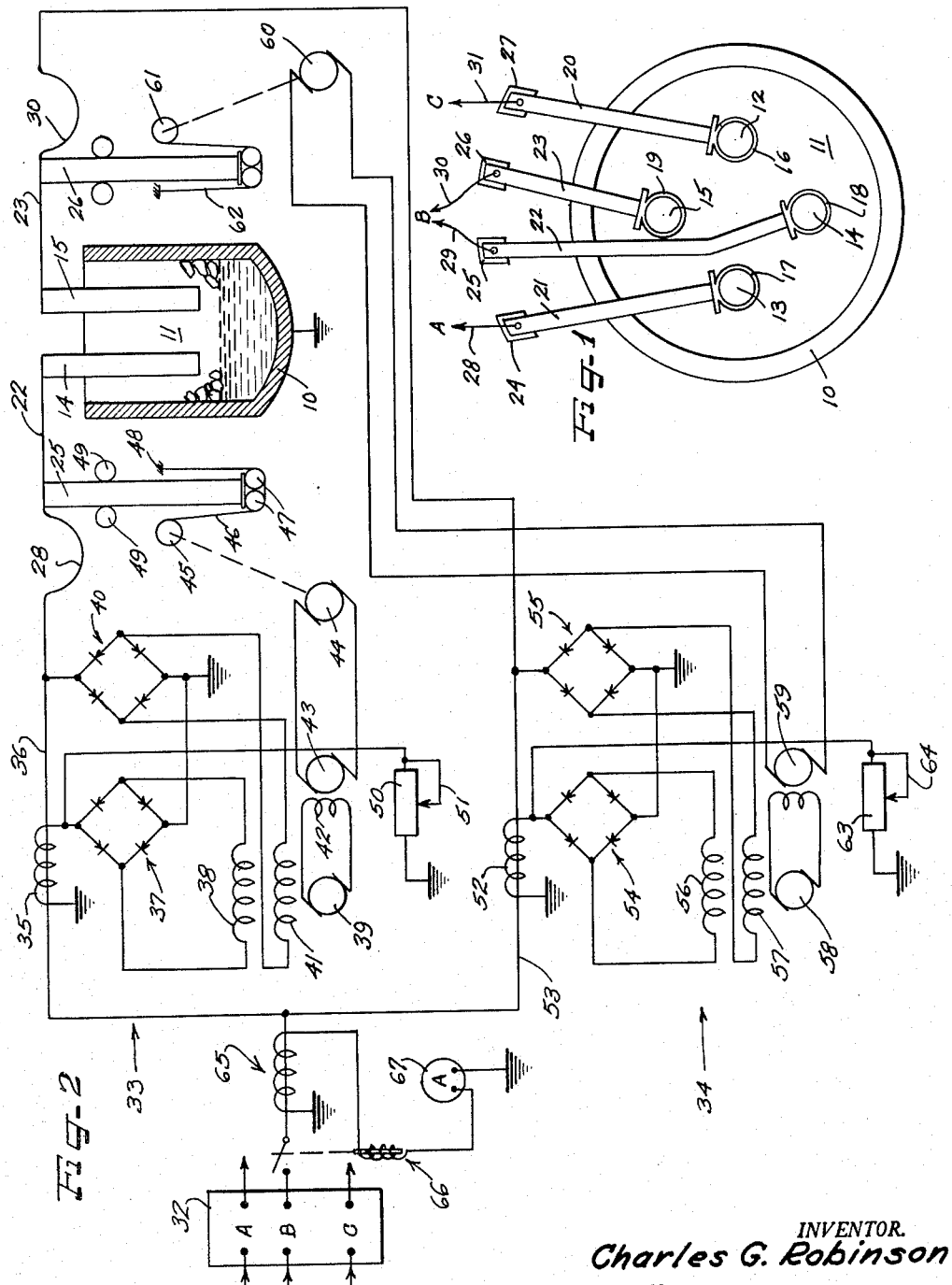

3,131,246
ELECTRIC FURNACE
Charles G. Robinson, Sterling, Ill., assignor to Northwestern Steel and Wire Company, Sterling, Ill., a corporation of Illinois
Filed Apr. 24, 1961, Ser. No. 105,212
7 Claims. (Cl. 13—9)

This invention relates to electric arc furnaces and, more particularly, to such a furnace wherein the electrodes and the control circuits are arranged so that the furnace operates in a more efficient and desirable manner than has been possible heretofore.

Arc-type electric furnaces for the production of steel from scrap material have become relatively well known in recent years. Commercial furnaces of this type are quite large and it is, of course, important that they operate as efficiently as possible. They usually have three electrodes which are connected to the output of a three phase electric power supply system, and each of the electrodes is connected to an apparatus for varying the height of its associated electrode above the material in the furnace in order to vary the length of the electric arc.

It has been found that when three electrodes are operated at the same level with respect to the melt, the center or phase B electrode has the least amount of impedance. This makes the B electrode considerably hotter than the other two electrodes in terms of electrical power. With a smaller amount of impedance, the voltage at the tip of this electrode is somewhat higher, and, previously, one way to compensate for this unbalance was to move the electrode tip close to the melt and shorten the length of the arc. But this solution has proved to be unsatisfactory since by lowering the electrode the current through it is immediately raised, which tends to overheat the electrode and increase the rate at which the graphite electrode is consumed by the oxidation process.

A still further difficulty encountered when the impedance of these three phases is unbalanced is that the walls of the electric furnace are not heated uniformly. The portion of the furnace adjacent the center B electrode is relatively hot while the portion of the furnace away from this electrode is relatively cool. These hot and cold spots within the furnace increase the cost of maintaining the refractory lining of the furnace.

A recent solution to this problem has been to restrict the voltage on the center phase by adding impedance increasing devices in this line. Electrode usage has still been high, however, due to high temperatures. Methods of decreasing the power in this center phase are also undesirable because the melting ability of the electric furnace is decreased.

Accordingly, it is a general object of this invention to provide an improved electric arc furnace so constructed that the difficulties or limitations inherent in previous electric arc furnaces are eliminated or minimized.

It is another object of this invention to provide an improved electric arc furnace wherein the center phase B electrode operates at lower current densities and lower temperatures.

Still another object of the invention is the provision of an improved electric arc furnace wherein the regulation is faster than heretofore obtainable and where the heat balance in the furnace is substantially uniform.

These and other objects of the invention are attained by providing an improved three phase electric arc furnace wherein four electrodes are provided, one of the electrodes being adapted to be connected to one phase of the three phase power supply, a second electrode being adapted to be connected to another phase, and the remaining two electrodes being adapted to be connected to the remaining phase. The two electrodes connected to the same phase are so positioned in the furnace that the difficulties previously described are eliminated or minimized.

The invention also includes separate control circuits for varying the height of each electrode relative to the surface of the melt in order to vary the length of each electric arc.

This invention may be better understood and other objects, features and advantages more apparent from the following detailed description taken in conjunction with the accompanying figures of the drawings, wherein like reference numerals refer to like parts, in which:

FIGURE 1 is a top elevational view of an electric arc furnace constructed in accordance with the invention; and FIGURE 2 is a schematic diagram of an electrical control circuit for the center phase electrodes of the furnace.

As shown on the drawing:

With particular reference to FIGURE 1, there is illustrated an electric arc furnace that includes a cylindrical housing 10 that is lined with a refractory material. Conventional means, not shown, are provided to charge the furnace chamber 11 with scrap steel or other material to be melted and to discharge the melt. Four vertical graphite electrodes 12–15 are conventionally mounted above the cylindrical housing 10 and extend downwardly into the chamber 11 to a position such that their lower tips are suitable heights above the level of the melt.

These four electrodes 12–15 are held in place by four electrode holders 16–19, respectively. These holders in turn are fastened to hollow water cooled tubes 20–23 which are fastened at their opposite ends to a plurality of vertically extending masts 24–27. The masts are part of the lifting mechanism which will be described in greater detail hereinafter. The tubes 20–23 are also electrically connected by a plurality of flexible electrical leads 28–31 which are coupled to a plurality of control circuits and to the output of a polyphase electrical transformer. The lead 28 is connected to the A phase, the leads 29 and 30 are connected to the B phase and the lead 31 is connected to the C phase. As can be seen from FIGURE 1, the electrodes 12–15 are symmetrically located in the furnace chamber 11 at the corners of a square.

FIGURE 2 illustrates schematically the control circuits for the two electrodes 14 and 15 connected to the center phase B. A suitable three phase electric power supply is connected to the input terminals of a three phase power transformer 32, and the output terminals of this transformer 32 are connected to the various electrodes. The upper phase A output terminal is connected to a conventional control circuit (not shown) and the electrode 13, the lower phase C terminal is connected to another conventional control circuit (not shown) and to the electrode 12, and the central phase B terminal is connected to two control circuits 33 and 34, FIGURE 2, and to the electrodes 14 and 15.

The control circuit 33 includes a current transformer 35 which senses the current in a line 36 that runs between the central phase B terminal of the transformer 32 and the electrode 14. This current transformer 35 is connected to the input to a full wave rectifier 37 which has its output connected across a control field 38 of a regulator or generator 39.

The voltage on the line 36 is also sensed by a second full wave rectifier 40 which is connected between the line 36 and ground and has its output connected across a second control winding 41 of the regulator 39. These two control windings 41 and 38 set up opposing fields, and the regulator 39 produces an output that is proportional to the resultant of the two fields and feeds it to the field winding 42 of a generator 43. The output of the generator is connected to drive an electric motor 44 which preferably has a shunt field (not shown).

The motor 44 has its drive shaft coupled to drive a winch 45 and a cable 46. The cable is looped around two rollers 47 and anchored at 48 and supports the mast 25. The upper end of the mast is guided by two other rollers 49. It is apparent that if the winch rotates and winds up the cable 46, the rollers 47 will move upwardly and hoist the mast 25 and the electrode 14.

The position of the electrode relative to the melt and the length of the arc is controlled by a variable resistor 50 which is connected between the output of the current transformer 35 and ground. By varying the setting of the movable arm 51, more or less current can be shunted to ground around the rectifier 37, thereby varying the current in the control winding 38, the setting of the motor 44 and the position of the electrode 14.

The second control circuit 34 for the electrode 15 is identical with the first control circuit 33 and, therefore, will not be discussed in detail. This circuit also includes a current transformer 52 that is coupled to a line 53 running between the output of the transformer 32 and the electrode 15, two rectifiers 54 and 55, two control windings 56 and 57 for a regulator 58, a generator 59 and motor 60 combination, and a winch 61 and cable 62 for varying the position in a vertical direction of the mast 26 and the electrode 15. This second control circuit 34 also includes a control resistor 63 so that the position of the electrode 15 can be varied independently of the position of an electrode 14 by changing the setting of the movable arm 64.

Another current transformer 65 is electrically connected to the line that leads from the phase B output terminal of the transformer 32 to the two lines 36 and 53. This current transformer 65 is connected to operate an over current relay 66 in the event the current to the two electrodes 14 and 15 rises to an unsafe level. An ammeter 67 is also connected to the output of the current transformer 65 and indicates the magnitude of the current.

The two electrodes 12 and 13 that are connected to the phase A and C output terminals of the transformer 32 are also coupled to control circuits which vary the vertical position of these two electrodes. The control circuits for these electrodes may be identical to either one of the control circuits 33 or 34 or they may be conventional types.

In operation, it is apparent that the position of each one of the electrodes 12–15 is determined by its control circuit. These control circuits maintain the length of the arc for each electrode at a constant value by causing the motor 44 in the control circuit 33, for example, to rotate if the current or the voltage in the line 36 vary.

By dividing the central B phase electrode into two parts in the manner described, the current in each of the electrodes 14 and 15 will be approximately one half of the value existing when three electrodes are used. The transformer 32 still sees practically the same load as when three electrodes are used in the conventional manner. The size of each of these two split electrodes 14 and 15 can be made smaller than the remaining two electrodes 12 and 13 if desired because of the reduced current. The hot spot wall which normally is adjacent the central B phase electrode in the usual three electrode system will decrease in intensity since the amount of current flowing through the split electrode in this area will have less current flowing through it. Further, the cold spot wall that is normally encountered in three electrode systems on the wall opposite the central B phase electrode is also improved because one of the split electrodes is now in this region. It can be seen that a portion of the power is taken away from the hot spot wall and placed adjacent the usual cold spot wall. Therefore, the heat flow in the electric furnace is considerably equalized, and this is accomplished with no power input restrictions. This heat balance is important, because, as previously described, it reduces the cost of maintaining the refractory lining in the furnace and makes the unit more efficient. As a still further advantage, the electrodes are at a much lower temperature during operation which reduces the oxidation process and the rate of consumption of the electrodes. Still another important advantage of the apparatus described is the fact that a much finer degree of control over the furnace is provided by this arrangement.

It will be apparent that modifications and variations may be effected without departing from the scope of the novel concepts of the present invention, and it will be understood that the application is to be limited only by the scope of the appended claims. For example, the positions of the four electrodes may be varied slightly and substantially the same advantages achieved.

I claim as my invention:

1. In an electric arc furnace, a housing forming a chamber, a three phase electric arc system consisting of four electrodes mounted so as to extend downwardly into said furnace chamber, one of said four electrodes being connected to one phase of a three phase electrical power source, a second one of said four electrodes being connected to another phase of the power source, and the remaining two electrodes being connected to the remaining phase of the power source.

2. In an electric arc furnace, means forming a furnace chamber, a three phase electric arc system consisting of four electrodes adjustably mounted on said chamber forming means and extending into said chamber, means coupled to said four electrodes for varying the positions of said electrodes in substantially vertical directions, one of said four electrodes being connected to one phase of a three phase electrical power source, a second one of said four electrodes being connected to another phase of said power source, and the remaining two electrodes being connected to the remaining phase of the three phase power source.

3. In an electric arc furnace, a housing forming a furnace chamber, a three phase electric arc system consisting of first, second, third and fourth electrodes mounted in such a manner that they extend downwardly into said furnace chamber, said first electrode being connected to the first phase of a three phase electrical power source, said second and third electrodes being connected to the center phase of the three phase electrical power source, and said fourth electrode being connected to the third phase of the three phase power source.

4. In an electric arc furnace, means forming a furnace chamber, a three phase electric arc system consisting of first, second, third and fourth electrodes mounted in such a manner as to extend vertically downwardly into said furnace chamber, said first electrode being connected to phase A of a three phase power supply, said second and third electrodes being connected to phase B of the three phase power supply, and said fourth electrode being connected to phase C of the three phase power supply, said four electrodes being positioned in such a manner that they are at the corners of an imaginary four sided figure, and said second and third electrodes being at opposite corners of the four sided figure.

5. In an electric furnace, a housing forming a furnace chamber, a three phase electric arc system consisting of first, second, third and fourth electrodes mounted to extend vertically downwardly into said furnace chamber, a three phase power transformer which is adapted to have its input terminals connected to a three phase alternating current power supply, the output phase A terminal of said transformer being connected to said first electrode, the output phase B terminal of said transformer being connected to said second and third electrodes, and said output phase C terminal of said transformer being connected to said fourth electrode, said second and third electrodes being disposed on opposite sides of said furnace chamber.

6. In an electric furnace, a housing forming a furnace chamber, a three phase electric arc system consisting of first, second, third and fourth electrodes mounted to extend vertically downwardly into said furnace chamber, a three phase power transformer which is adapted to have its input terminals connected to a three phase alternating current power supply, the output phase A terminal of said transformer being connected to said first electrode, the output phase B terminal of said transformer being connected to said second and third electrodes, and said output phase C terminal of said transformer being connected to said fourth electrode, said second and third electrodes being disposed on opposite sides of said furnace chamber, means coupled to each of said electrodes for varying the position of said electrodes in a vertical direction, and a control circuit means for each of said electrodes which causes said position varying means to change the vertical positions of said electrodes in response to voltage and current variations on the lines leading to said four electrodes.

7. In an electric furnace, a housing forming a furnace chamber, a three phase electric arc system consisting of first, second, third and fourth electrodes mounted adjacent said housing in such a manner that said electrodes extend downwardly into said furnace chamber, a three phase transformer having phases A, B and C output terminals, said phase A output terminal being connected to said first electrode, said phase B output terminal being connected to said second and third electrodes, and said phase C output terminal being connected to said fourth electrode, separate means for each of said electrodes for adjusting the positions of said electrodes, separate control circuit means for each of said electrodes which is responsive to the current and the voltage on each of said electrodes, said means for varying the vertical positions of said electrodes being responsive to said control circuits, said four electrodes being disposed in such a manner that they are at the corners of an imaginary four sided figure, and said second and third electrodes being at two opposing corners of the imaginary figure.

References Cited in the file of this patent
UNITED STATES PATENTS

| | | |
|---|---|---|
| 1,113,778 | Gray | Oct. 13, 1914 |
| 1,206,057 | Von Eckermann et al. | Nov. 28, 1916 |